US006342085B1

United States Patent
Giroux et al.

(12) 
(10) Patent No.: US 6,342,085 B1
(45) Date of Patent: Jan. 29, 2002

(54) COMPOSTING METHOD FOR AGRICULTURAL ANIMAL MANURE

(76) Inventors: Craig R. Giroux; Wilfred E. Giroux, both of 8917 Rte. 9, Chazy, NY (US) 12921

( * ) Notice: Subject to any disclaimer, the term of this patent is extended or adjusted under 35 U.S.C. 154(b) by 0 days.

(21) Appl. No.: 09/412,153

(22) Filed: Oct. 5, 1999

(51) Int. Cl.[7] .............................. C05F 11/08; C05F 3/00
(52) U.S. Cl. .................................................. 71/9; 71/21
(58) Field of Search ........................... 71/9, 11, 12, 13, 71/21, 22

(56) References Cited

U.S. PATENT DOCUMENTS 4,193,786 A * 3/1980 Brill ................................ 71/9
4,397,674 A * 8/1983 Laughbaum ..................... 71/9

* cited by examiner

Primary Examiner—Wayne Langel
(74) Attorney, Agent, or Firm—Randall L. Reed; Levin & Hawes, LLP

(57) ABSTRACT

A method and system is disclosed for composting animal manure. Specifically it is a method that composts chicken manure which at the same time reduces the odor produced by the manure and kills undesirable insects which have a tendency to live in manure piles. The method includes gathering the manure together in long rows. Turning manure on a periodic basis with a horizontal augur so that substantially the portion of the manure pile that was on the outside is buried in the inside. Assuring that the temperature in the manure pile reaches between 90 and 150 degrees so that the life cycle of insects which live in the pile is disrupted. Intermittently adding an absorbent material such as sawdust to absorb the odor and enhance the composting effect.

11 Claims, 4 Drawing Sheets

COMPOSTING METHOD FOR AGRICULTURAL ANIMAL MANURE

FIELD OF THE INVENTION

The present invention relates to composting animal manure. More particularly it relates to a method of composting agricultural animal manure for reducing the foul odors and flies generated by such activity.

BACKGROUND OF THE INVENTION

Chickens, hogs and other domestic animals sold commercially are raised on large farms. Such large concentration of animals naturally produce large amounts of manure. The manure in turn generates foul odors and provides an ideal breeding ground for various insects and pests. The manure aside from its negative aspects, when properly processed, provides an excellent fertilizer for crop production. Numerous attempts have been made to limit the negative aspects of animal manure, enhance its positive aspects and make it easier to handle. Currently, in particular with dairy and beef operations the practice has generally been to liquefy the manure for ease of processing and handling. However, this in some respects enhances many of the negative aspects of manure.

The trend now appears to be to use methods which reduce the negative aspects of manure produced on large farms namely the odors and insect infestations. This trend has been enhanced by increased environmental awareness and a growing intolerance of the general public of the odors and insects generated in such large operations.

The common practice with chickens and the trend with other domestic animals is to raise these animals in large barns. Generally, the barns have two stories with the animals housed on the second floor and the manure produced by the animals collected on the first floor for processing. Such a large concentration of fresh manure naturally generates foul odors and provides a fertile base for insects, in particular, flies and beetles to bred.

One solution with respect to solving the fly infestation problem is the use of natural predators, i.e. other insects, wasps or beetles, which prey on the fly larva or other undesirable insects found that breed in manure. Although this can provide an effective solution it also is extremely expensive and can create its own problems of infestations of the predator insects. Additionally, there is a trend towards dry composting as one way to attempt to eliminate or reduce the odors and insect infestations. Some of these dry composting techniques have included the addition of paper or wood chips to absorb moisture. However, the paper has a tendency to become soggy and neither the paper nor the wood chips have a tendency to breakdown in a sufficiently quick enough period of time to aid significantly in the composting process. Additionally, none of these dry composting techniques have significantly reduced the foul odors or insect infestations while at the same providing an economical and efficient method.

Consequently, as of yet no one has come up with an effective, economical and easily implemented process or mechanism for disposing of animal manure and in particular chicken manure which can also significantly reduce foul odors and insects which breed in the manure.

SUMMARY

It is the object of the invention to provide efficient and effective method of dealing with manure and the foul odors and insects breeding therein. In particular, to provide a method which is easily intergradeable into a large farming operation.

It is the further object of the present invention to provide a method which substantially reduces the foul odors generated by chicken manure.

It is another object to the present invention to significantly reduce the insects breeding in chicken manure.

These and other objects of the present invention are accomplished by providing a method for composting manure which includes the steps of:

a. collecting the animal manure together produced by the animals in a large farm operation, b. piling the manure in a configuration which is sufficiently wide and deep enough so that the natural composting process generates heat of at least 100 degrees Fahrenheit, c. periodically turning the pile over so that a substantial portion of the manure on the outside of the pile is turned into the inside of the newly formed pile while at the same time maintaining the natural composting effect and adding a moisture absorbent substance to the pile on an intermittent basis to absorb moisture and enhance the composting effect, whereby the heat generated in the pile and its periodic turning of the pile and the adding of the moisture absorbing substance disrupts the life cycle of insects attempting to breed in the pile.

Another aspect of the method of the invention includes forming piles that are at least 12 inches deep, 2.5 feet wide and at least 2.5 feet long.

In yet another aspect of the method of the present invention the step of turning the pile consists of turning it on a daily basis.

BRIEF DESCRIPTION OF THE DRAWINGS

The invention will be better understood by an examination of the following description, together with the accompanying drawings, in which.

DETAILED DESCRIPTION OF THE PREFERRED EMBODIMENT

The invention described herein provides a quick, clean and efficient method for limiting insect infestation and reducing odors created by an agricultural operation which produces or uses animals in its process. The invention does this by providing a method for composting the manure produced by the animals which significantly reduces insect infestations and odors produced. It also produces an environmentally acceptable organic fertilizer with significant amounts of nitrogen, phosphorous, potassium, etc.

The invention provides a method which includes the steps of:

1. piling the manure produced by the animals in the agricultural production in a sufficiently deep pile to initiate and sustain a natural composting effect within the pile and maintain a minimum temperature within the pile;

2. periodically turning or agitating the pile, generally on a daily basis in the preferred embodiment, while maintaining a minimum bulk and shape in the pile to sustain the composting affect;

3. intermittently adding a moisture absorbing material which can aid in and form a natural part of the composing process, generally sawdust in the preferred embodiment; and 4. removing on a routine basis the bulk of the pile for disposal, generally for sale as a fertilizer or for a secondary composting process while maintaining the minimum bulk and shape of the original pile to continue the natural composting process.

Figure 1:
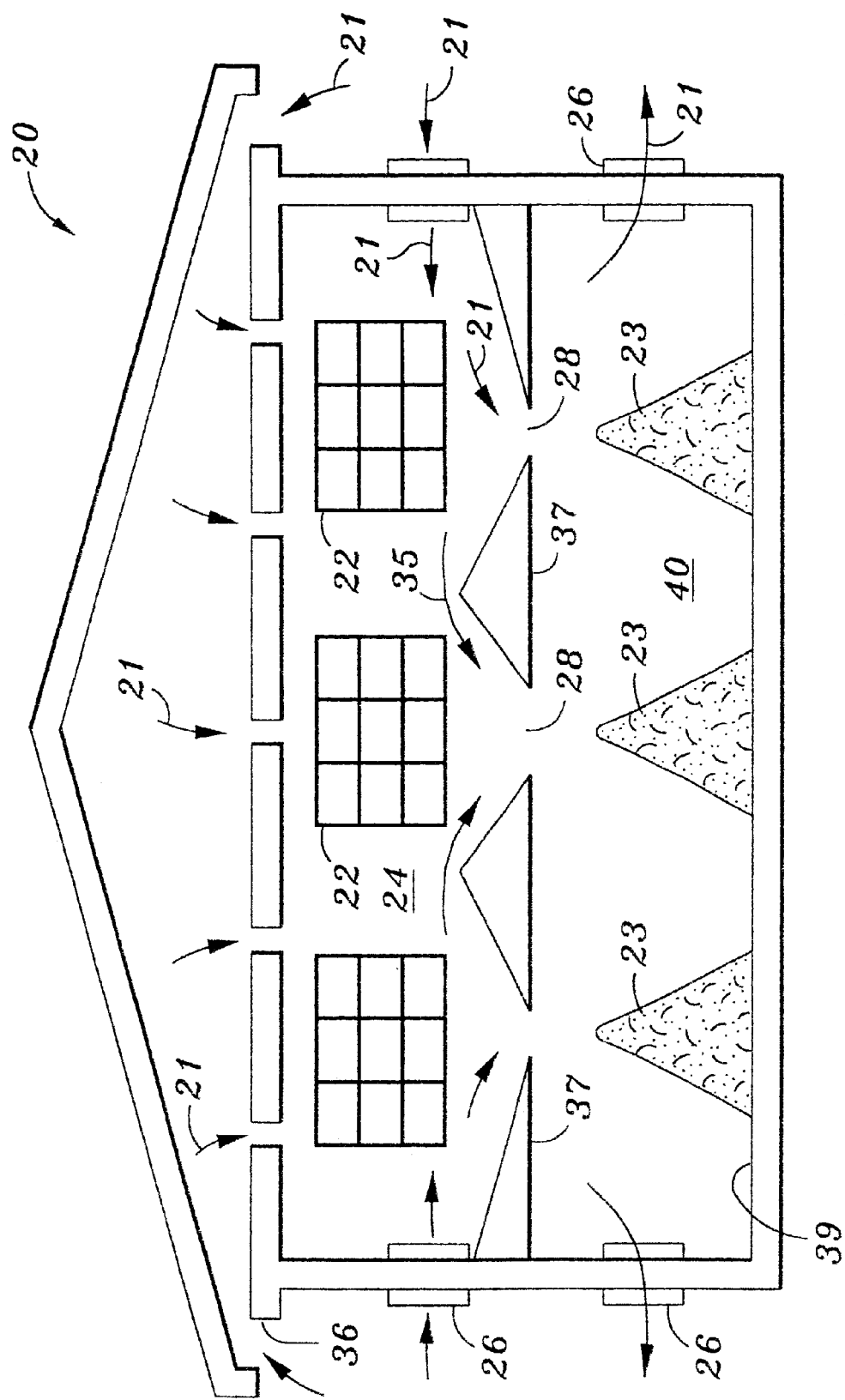
FIG. 1 provides a schematic diagram of cross sectional view of a typical two-story chicken house.

The particulars of the present invention will be described in the context of a commercial poultry operation. FIG. 1 provides a schematic diagram of a cross sectional view of the major components of a typical two story chicken house used in a commercial poultry operation. Generally, the chickens are maintained in cages 22 on the second floor 24 of the house. Access walkways 35 are provided to allow access by workers to the chicken cages 22. Flooring 37 separates the first 40 and second 24 stories of the chicken house 20. Openings or slots 28 are provided in the flooring 37 which allow for both the flow of air and for the manure produced by the chickens to fall down to the first story 40. When the manure falls through the slots 28 in the flooring 37 it eventually accumulates as piles 23 on the first floor 39 of the chicken house. Generally, in commercial operations a positive flow of air is consistently maintained in the chicken house wherein the flow of air enters the second story 24 of the chicken house and then is drawn out through the first story 40 of the chicken house. Arrows 21 depict the direction of the flow of air as it enters at the vent openings or windows 26 as well as vents 36 and eventually exists through the vent openings 26 on the first floor. This consistent flow of air 21 helps moderate the ambient temperature around the chickens. Additionally, the direction of the flow prevents the migration of odors from the first story of the chicken house which contains the manure piles 23 to the second story as well as prevents the migration or movement of insects produced in those piles from moving back up into the second story. The flow of air is created and controlled by fans and allied devices which are well known within the industry. Also, standard machinery or techniques not discussed here but well known in the industry are used to direct the manure produced by the chickens on the second floor down through the slots 28 to the first floor 39.

Figure 2:
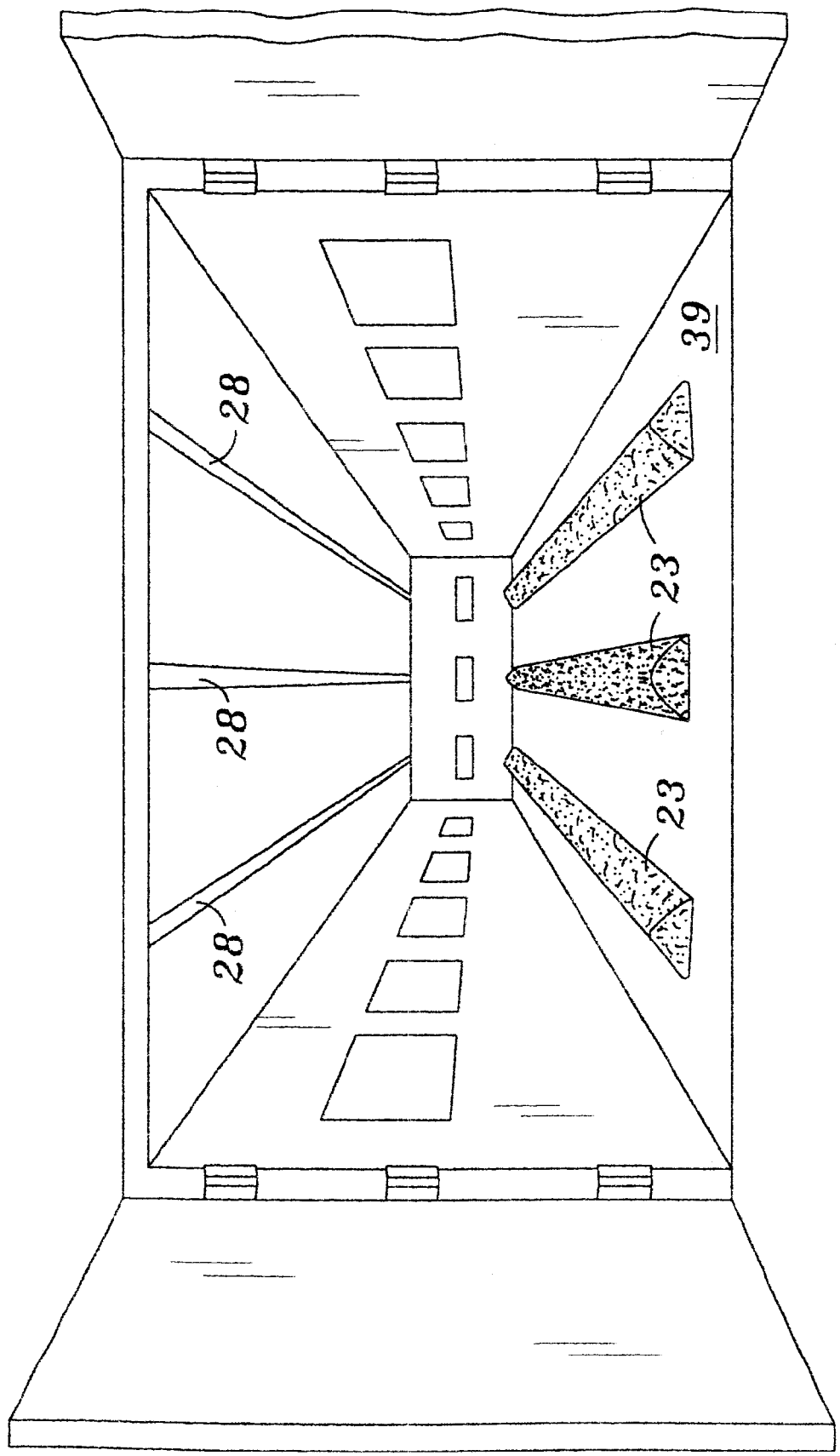
FIG. 2 a perspective view of the first floor of a typical two-story chicken house.

FIG. 2 provides a perspective view of the first story of the typical commercial two-story chicken house. Therein can be seen the slots 28 through which the manure produced by the chickens falls to accumulated on the first floor 39. Generally the first floor 39 of the typical chicken house is concrete slab.

As depicted in FIG. 2 the manure when it falls down through the slots accumulates on the first floor 39 of the chicken house. The preferred embodiment of this invention provides for the maintaining of the manure in long rows 23 which generally run almost the entire length of the first floor 39 of the chicken house 20. Generally, the typical chicken house in a commercial operation averages about 50 feet in width and from 50 to 200 yards long. The rows of manure 23 are maintained so that they have at least a minimum depth of about 10 to 18 inches and a minimum width of 2½ to 3 feet wide. It has been found that this maintains the preferred natural composting effect that takes place in animal manure and in particular chicken manure. One of the benefits of maintaining this size of pile is that it allows for the generation of temperatures within the composting manure pile from at least 100 to 150 degrees Fahrenheit. This is one of the particular important aspects of this invention which will be discussed at length below. An additional aspect of this invention is the periodic turning or agitation of these piles while maintaining their shape and size. In the preferred embodiment of this invention this daily agitation or turning of the pile is accomplished by use of a horizontal augur 31 as depicted in FIG. 4. As depicted in FIG. 4 the horizontal augur 31 which can either be one operated by an individual walking behind it or in a larger version one on which the operator sits on the vehicle 32 in FIG. 3. The augur is placed such that the existing row 23-A is picked up by the receiving side of the augur 31-A and is then moved through the augur blade 31-B and is deposited as a new row 23-B at the outlet 31-C of the augur blade 31-B. Additionally, new chicken manure which may have been deposited on the floor at 23-C is also picked up by the augur blade and mixed in with the manure from the initial pile 23-A. Thus, on a daily basis one would see the piles 23 in FIG. 2 being shifted back and forth on a daily basis as the piles or rows of manure 23 are turned or agitated.

Figure 3:
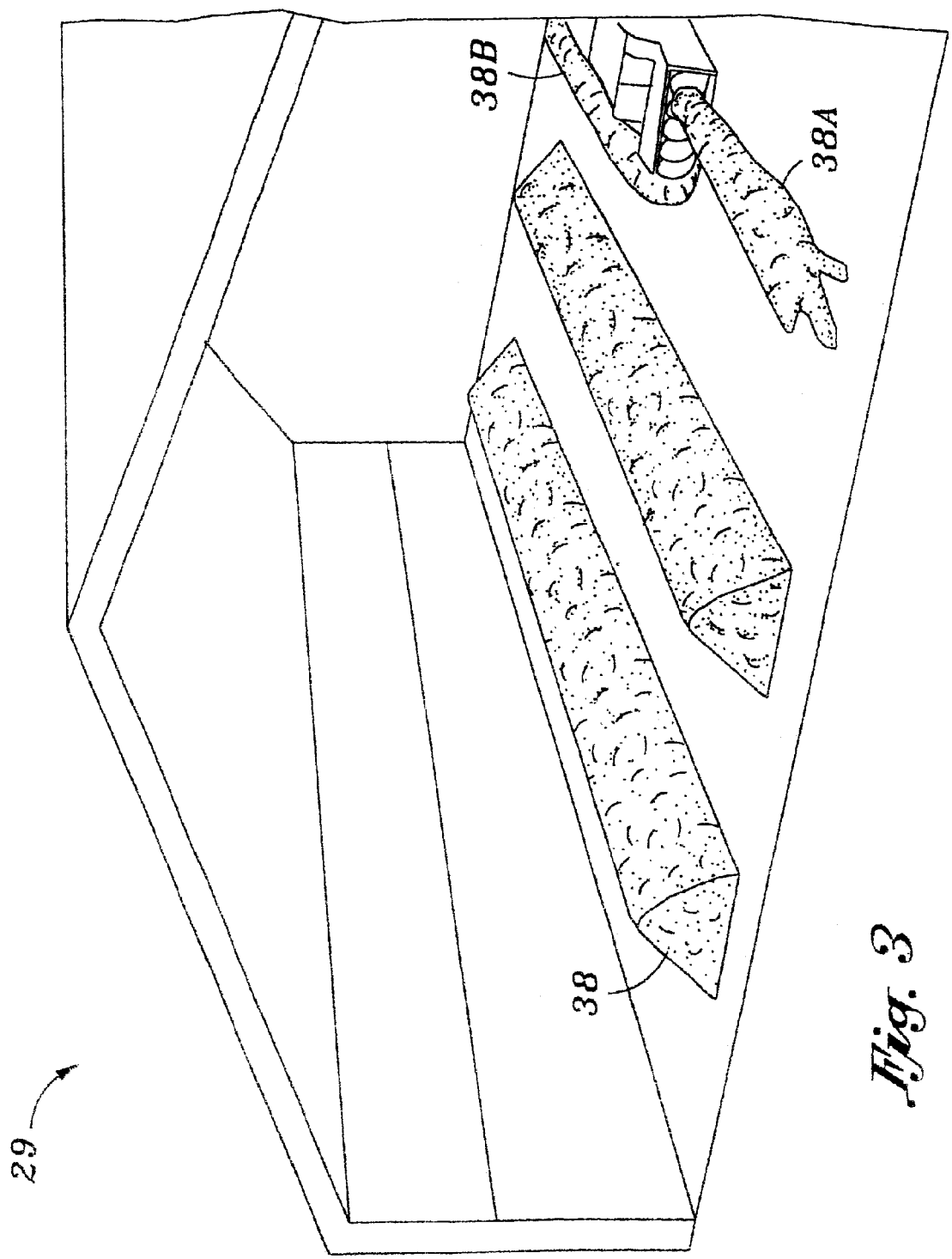
FIG. 3 a perspective view of an open air manure parlor.
Figure 4:
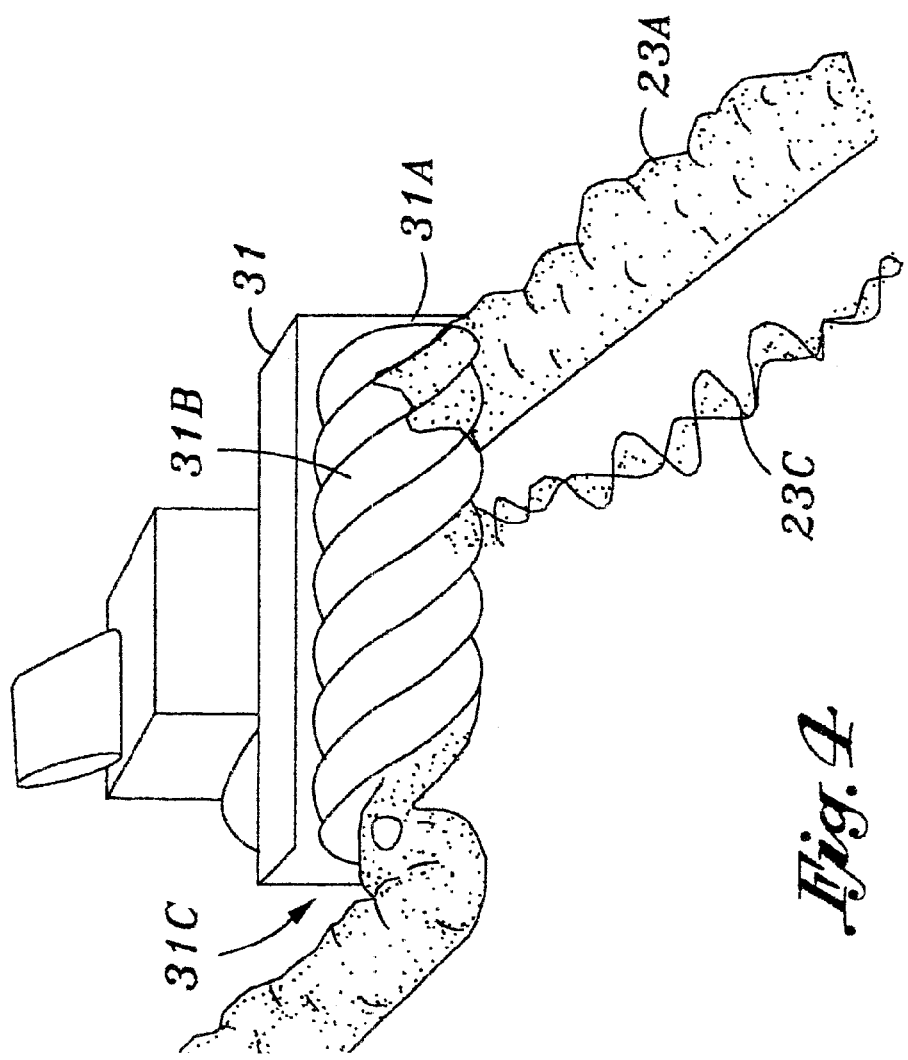
FIG. 4 depicts a horizontal augur conducting one of the steps of the present invention.

Horizontal augurs as depicted in FIGS. 3 and 4 are fairly well known machines. They can be either specifically made as a horizontal augur or an add on device that can be added to a tractor for use with the tractor. A horizontal augur as depicted in FIGS. 3 and 4 is simply an augur blade, a cork screw type of blade, is set on a horizontal orientation to move material in a horizontal direction. Vertical augurs differ from horizontal augurs in that they are normally used to drill holes, in particular, a fence post hole on a farm. In the preferred embodiment the smaller auger used in the chicken house works best when the augur is a rubber tracked vehicle rather than a wheeled one.

It has been found this daily agitating or repiling of the piles or rows of manure buries inside the new pile substantially most or all of the exterior portion of the original pile. It has also been found that the daily agitation or reconfiguring of the piles or rows of manure does not significantly interfere with the composting process. In fact, it has been found that generally a minimum temperature range of from 100 to 150 degrees can be maintained in the pile. Naturally most or all of the heat is generated by the composting effect. The composting effect results from microorganisms normally found in manure. These microorganisms which initiate and conduct and sustain the composting process include: aerobic bacteria, anaerobic bacteria, fungi, actinomycetes, pseudomonads, nitrogen fixing of bacteria, etc. It has been found by appropriately timing the agitation and reconfiguration of the pile that the life cycles of insects which normally breed in chicken manure can be substantially disrupted. It is assumed that this results in high mortality of insects breeding in the pile. As is well known chicken manure has the tendency to produce substantial amounts of flies, and darkling beetles and other insects. One of the benefits of maintaining a temperature of from a 100 to 150 degrees Fahrenheit within the composting pile turning it or agitating daily is that it kills the flies when they are in the pupa state of their life cycle. Typically a fly's larva develops into an adult fly within four to seven days after hatching from eggs and progressing by various stages through larva and pupa stages. Thus this daily turning of the pile catches them during the times they are most vulnerable in their life cycle.

Additionally, there are also other mechanisms at work which interfere with and disrupt the life cycle of the insects breeding in the manure piles as a result of the periodic agitation or turning, which in the preferred embodiment is done on a daily basis. The heat maintained in the pile probably affects or kills other insects including the darkling beetle at various venerable stages of their development. One would also have to assume that the normal composting affect of the microorganisms found in a typical naturally composting manure pile would result in mortality of the insects breeding therein. Obviously, one of the important aspects of this invention is the maintaining of an appropriate agitation or piling turning schedule and maintaining the integrity of the form or structure. Although, the preferred embodiment in the present invention calls for a daily turning as well as a pile with a minimum width of 2½ feet and depth of 12 inches other turning schedules could be used and different pile configurations could be used and the invention still practiced. However, obviously the periodic turning of the pile and its configuration would have to be done such that it would interdicts the insects breeding in the pile during their life cycle.

Figure 5:
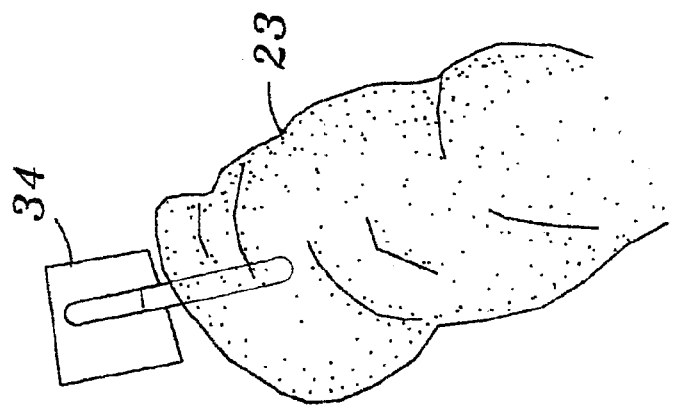
FIG. 5 a view of the step of determining the temperature of the interior of a manure pile.

In the preferred embodiment the temperature of the pile is checked on a daily basis as depicted in FIG. 5. Normally a standard type of thermometer 34 that allows you to take the temperature of the interior of the pile by inserting a probe, not shown, can be used. Additionally, one could conceive of more sophisticated ways to monitor the temperature which could even potentially include permanent sensors located on or near the floor.

An additional aspect of the present invention includes the addition at intermittent times appropriate material which can help absorb some of the moisture of the pile and also enhance the composting effect. In the preferred embodiment of this invention it has been found that sawdust provides the ideal medium for enhancing the composting effect by adding a significant source of carbon, reducing odor and absorbing moisture in the manure. In fact it has been found to be superior to paper or wood chips in its moisture absorbing effect as well as its effect in enhancing the composting process and odor control. In the preferred embodiment it has been found that adding one part sawdust to three to four parts manure during the Summer and one part sawdust to one to two parts manure during the Winter appears to provide the optimal results. The actual proportions of sawdust added to the manure depends on the weather, temperature, moisture in the air and other general changes in the environment. As noted herein the temperature of the pile is taken on a daily basis and used to determine the proportions that sawdust must be mixed with the manure. As previously indicated the sawdust helps to absorb the liquid portion of the manure and thus reduce its moisture content, a highly desirable effect which helps reduce insect infestation. Additionally, the sawdust, given its relatively small granular size and cellulose composition is easily integrated into the composting process. In the preferred embodiment it has been found that intermittently adding the sawdust generally on a once a week basis during the Winter and a bi-weekly basis during the Summer appears to be optimal in obtaining the desired results.

Although the description of the invention discusses it use in a two story chicken house with a floor separating the first and second story it can just as easily used with chicken house of different configurations and the same results achieved. The invention can be used with a two story chicken house with no floor separating the first and second story and the cages are suspended in the second story over the first story. It could also be used in a one story chicken house as long as the manure is kept in a covered building and the piles are rotated and maintained as described above.

Naturally, during this process a substantial amount of chicken manure will accumulate on the first floor of the chicken house 20. Consequently, in the preferred embodiment of this invention the majority of the manure is periodically removed from the chicken house and moved to a secondary composting site for further composting. FIG. 3 depicts the set up used in the present invention. FIG. 3 is an open sided and covered manure parlor 29 with an average width of anywhere from 50 to 100 feet and a length of 100 or more feet. The manure removed from the chicken house 20 is reconfigured into similar long rows 38. When the chicken manure is removed from the chicken house 20, FIG. 2, a sufficient amount is left in each pile 23 to maintain the natural composting process. As indicated above, the preferred embodiment provides for the retaining rows 23 in the chicken house 20 which are at a minimum 12 inches deep and 2½ feet wide which run the majority of the length of the chicken house first floor. Removal of the excess manure from the chicken house 20 in the preferred embodiment is done every four to six weeks.

When the manure piles are reconfigured in the manure parlor 29 they typically would have to be configured in rows that have a minimum depth of 12 inches and width of 2½ feet. However, in the preferred embodiment the actual rows are much deeper and wider to more efficiently use the space available.

In the preferred embodiment the chicken manure removed from the chicken house and placed in the manure parlor 29 at least initially after transfer are also turned on a daily basis in the preferred embodiment. However, it is not critical to turn the piles in the Manure Parlors in a daily basis after one to two weeks since by then most of the insect pests breeding in the piles have generally been eliminated. At this point a less periodic schedule of turning can be 'used. Also, since in the preferred embodiment the rows of manure 38 are much deeper and wider a larger horizontal augur 32 is used. In fact in the preferred embodiment it is of such a size that the operator would normally sit on it during operation. As depicted in FIG. 3 on a daily basis the augur moves down each row and reconfigures the original row 38-A as new row 38-B as depicted therein. Additionally, sawdust is added on a regular basis in propositions and in a timing similar to the way sawdust is added to the initial piles 23 in the chicken house 20. In FIG. 2 the preferred embodiment typically the manure is maintained in the manure parlor 29 for a period of 4 to 6 weeks. At the end of this period it has been found that the manure becomes sufficiently cured to be used as fertilizer. Naturally, as is well known four to six months is needed to fully cure a manure pile. It has been found that the above described process has an additional beneficial affect in that the composted manure contains substantial amounts of elements desirable in manure namely nitrogen, phosphorus, potassium, etc.

While the invention has been particularly shown and described with reference to a preferred embodiment thereof, it will be understood by those skilled in the art that various changes in form and detail may be made to it without departing from the spirit and scope of the invention.

We claim:

1. A method for composting manure comprising the steps of:
    a. collecting in a structure housing animals, manure produced by the animals in a space beneath where the animals are located in the structure;
    b. piling the manure into rows which are sufficiently wide, deep and long enough to generate heat of at least 100° F. within an interior of said pile;
    c. periodically, turning the rows over so that a substantial portion of the manure on the outside of the pile is turned into the inside of a newly formed pile; and d. adding sawdust to the rows on an intermittent basis; whereby the heat generated in the pile, the periodic turning of the pile and the adding of sawdust disrupts the life cycle of insects attempting to breed in the pile, dries the pile out and reduces odors generated by the pile.

2. The method of claim 1 wherein the steps of forming the pile and turning the pile further comprises forming piles which are at least 10" deep, 2' wide and several feet long.

3. The method of claim 1 wherein the step of turning the piles comprises turning the piles every day.

4. The method of claim 1 wherein the step of intermittently adding saw dust comprises adding saw dust at least once a week.

5. The method of claim 1 comprising the further step of taking the temperature of the pile on a recurring basis to verify the pile has reached the required temperature.

6. The method of claim 1 wherein the step of collecting manure, is collecting manure on a floor located beneath chickens in a high rise chicken house.

7. The method of claim 1 wherein the step of adding saw dust comprises adding saw dust in the proportion of one part saw dust to three to four parts manure during warm weather.

8. The method of claim 1 wherein the step of adding saw dust comprises adding saw dust in the proportion of one part saw dust to one to two parts manure during cold weather.

9. The method of claim 1 wherein the step of periodically turning the pile comprises turning the pile with a horizontal augur.

10. The method of claim 1 comprising the further steps of:
   a. removing on a periodic basis a substantial portion of the manure composting in the structure;
   b. leaving a sufficient amount of the composting manure in the structure to continue the composting of manure and maintain the heat of the pile at 100° F.; and
   c. depositing the substantial portion of the composting manure removed into a secondary composting facility and continuing the composting of the substantial portion of composting manure removed with steps a, b, c and d of claim 1 until the composting manure is fully cured and suitable for use a fetilizer.

11. The method of claim 10 wherein the step of removing a substantial portion of the composting manure comprises removing it at least every four weeks.

* * * * *